United States Patent [19]

Lubienski

[11] Patent Number: 5,669,613
[45] Date of Patent: Sep. 23, 1997

[54] SEALING GASKET ARRANGEMENT

[75] Inventor: Richard J. Lubienski, Houston, Tex.

[73] Assignee: Flexitallic Inc., Deer Park, Tex.

[21] Appl. No.: 677,936

[22] Filed: Jul. 10, 1996

[51] Int. Cl.$^6$ ........................................ F16J 15/00
[52] U.S. Cl. .................. 277/204; 277/235 B; 277/203; 277/181; 277/189; 277/11
[58] Field of Search ...................... 277/11, 235 B, 277/203, 204, 181, 189

[56] References Cited

U.S. PATENT DOCUMENTS

| | | | |
|---|---|---|---|
| 2,462,762 | 2/1949 | Nardin | 277/11 |
| 3,815,927 | 6/1974 | Geipel | 277/180 |
| 4,813,691 | 3/1989 | Schoenborn | 277/236 |

FOREIGN PATENT DOCUMENTS 1452166  10/1976  United Kingdom ............... 277/204

*Primary Examiner*—William A. Cuchlinski, Jr.
*Assistant Examiner*—Christina Annick
*Attorney, Agent, or Firm*—Nixon & Vanderhye P.C.

[57] ABSTRACT

A sealing gasket (9, FIG. 1) has a spiral wound element 10 secured to a surrounding locating plate 11 which is thinner than usual locating rings and may include bolt apertures $23_1$ etc. The plate 11 has a central aperture 22 which is surrounded by simple embossment 26 inclined to the longitudinal axis at an angle corresponding to the inclination of the ridge 21 presented by the outer turn of the spiral wound element. The aperture 22 receives the sealing face 18 of the element thereby and overlies the ridge 21 to which it is spot welded at a plurality of points. The plate has some resilience permitting the spiral wound element to compress properly under load, but being simple to fabricate and assemble.

21 Claims, 1 Drawing Sheet

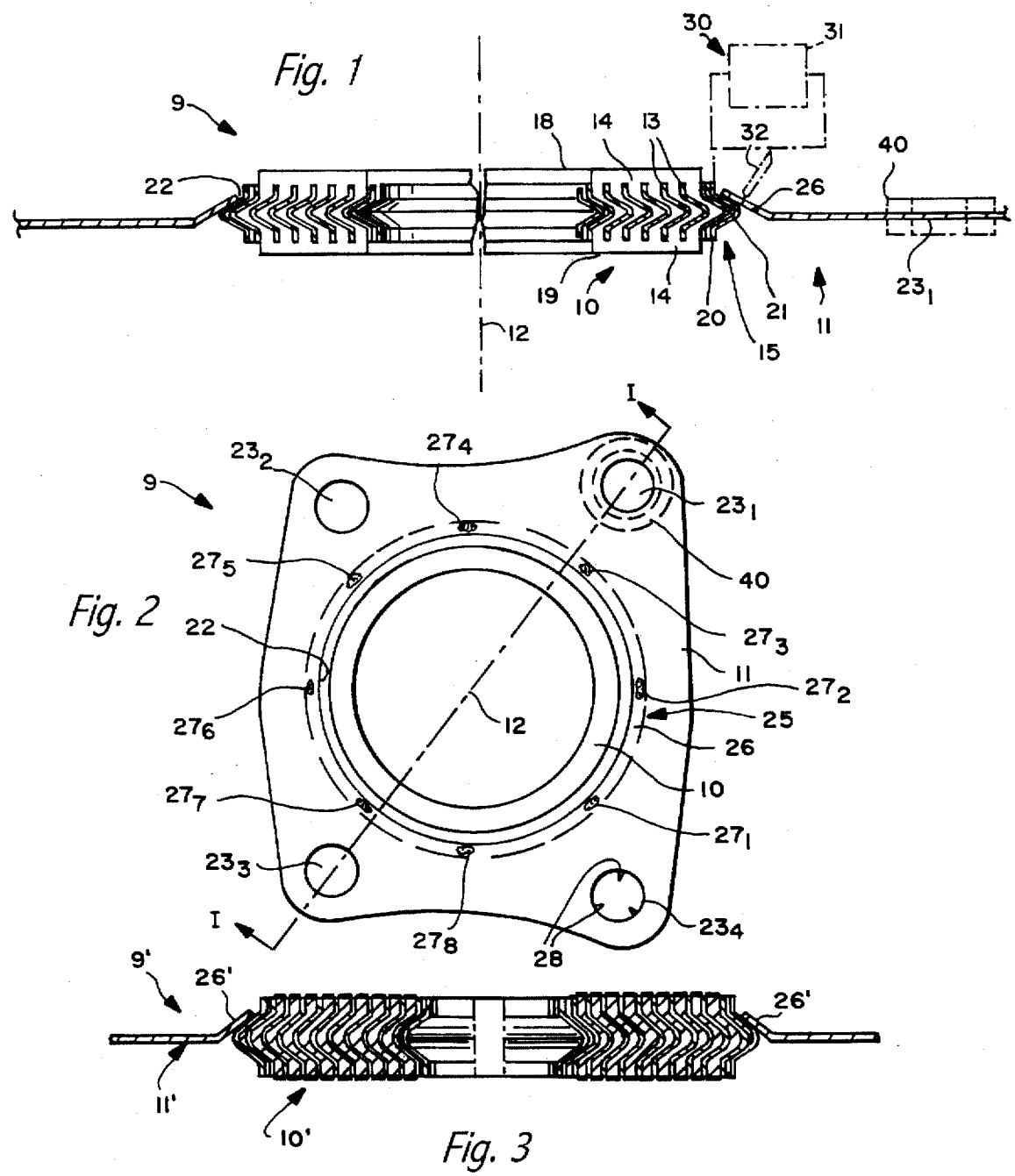

SEALING GASKET ARRANGEMENT

This application claims the benefit of U.S. Provisional Application No. 60/001,201, filed Jul. 14, 1995 now abandoned.

This invention relates to sealing gasket arrangements and particularly to such gasket arrangements in which the sealing is performed by a spiral wound element located with respect to adjacent sealing surfaces by a surrounding outer plate-like member.

Such spiral wound elements are well known per se and one such form is described in U.S. Pat. No. 5,161,807 and U.S. Pat. No. 5,275,423. The spiral wound element comprises a spiral winding about a longitudinal axis of layers of a flexible sealing material and generally V-sectioned, resilient metal reinforcement. The spiral is usually given integrity by welding the metal of successive turns at the outer and inner ends of the spirals. The edges of the windings of the sealing material, and possibly the reinforcements, in said axial direction, define sealing faces of the element which extend orthogonally thereto.

Such spiral wound gasket forms are frequently employed between flanges of pipes that are bolted together by a circular array of bolts surrounding the flanges. Such elements and surrounding plate-like members are therefore usually circular in plan, the surrounding member being therefore called a guide ring or locating ring.

Such guide ring also frequently performs the function of a compression stop to prevent over compression of the spiral wound element and is usually of such thickness, in an axial direction, to serve as such a compression stop. Furthermore, such ring is in any event normally of such thickness that its inner peripheral wall has a circumferential groove or notch therein to receive the outwardly extending ridge, formed by the resilient central part of the spiral wound element, by manipulation of the inherently resilient element.

In many instances it is undesirable to have such a thick guide ring, particularly if it is not necessarily required as a compression stop. If it is required to be other than a readily machined ring, that is, have an irregular outer periphery, and/or required to have locating and/or bolt holes therethrough, such a guide ring becomes an expensive item militating against usage of such spiral wound gasket forms in many applications, such as coupling exhaust ports of an automobile engine to exhaust pipes.

It has been proposed in UK patent GB-A-1452166 to manufacture such sealing gasket arrangement by using an outer locating member, surrounding the spiral wound gasket, formed by a pair of relatively thin and substantially planar metallic sheets welded to each other face-to-face into a composite plate that is apertured to receive the spiral wound element. The edges of the sheets surrounding the through-aperture are deflected respectively in opposite directions from the plane of the composite plate for form what is effectively a V-sectioned groove into which the spiral wound element can be manipulated as in earlier constructions to be held by the geometry of the groove. Although such a locating ring may be fabricated from cheaper materials than a machined, traditional guide ring/compression stop, it still needs several disparate operations to form and join the sheets and the spiral wound element manipulated into the groove formed by the sheets.

In U.S. Pat. No. 3,815,927 it has been proposed to manufacture such sealing gasket arrangement by using an outer locating member, surrounding the spiral wound element, of a single relatively thin, substantially planar plate or sheet. The plate includes a through-aperture to receive the spiral wound element and, in a region surrounding the through-aperture, is pressed or folded out of the plane of the plate to a complex shape that emulates the locating groove part in traditional thicker guide rings. However, such an arrangement is still expensive in requiring tooling for the two operations involved in locating an element. Firstly, an expensive press tool is required for each size of through-aperture to define a shape including a lip and element-receiving collar, and secondly, a crimping tool is required, again possibly for each aperture size, to radially contract the collar to retain the received element. The manufacture disclosed also involves making other complex features by pressing the outer locating member, and thus does not make any suggestion as to the cost effectiveness or otherwise of using this method simply to locate the spiral wound gasket.

It is an object of the present invention to provide a sealing gasket arrangement including a spiral wound element disposed within a locating or retaining plate which is produced more simply and with less specialised tooling than such gasket arrangements hitherto.

In accordance with the present invention a sealing gasket arrangement comprises (1) a spiral wound element, wound about a longitudinal axis, and including, between sealing faces that are separated along its longitudinal axis and extend orthogonally thereto, a resilient section comprising a ridge extending outwardly from said longitudinal axis and formed by metallic surfaces inclined to said axial direction, and (2) a locating plate having a through-aperture, corresponding in outline to the spiral wound element and dimensioned greater than the sealing faces but smaller than the element as a whole, and an embossment surrounding said aperture and inclined with respect to the plane of the plate to one side thereof at an angle corresponding substantially to the inclination of said metallic surfaces of the ridge of the element, said embossment being secured to said ridge at a plurality of locations about the periphery of the through-aperture.

Also in accordance with the present invention a method of manufacturing a sealing gasket arrangement comprises (1) forming a spiral wound element, wound about a longitudinal axis, and including, between sealing faces that are separated along its longitudinal axis and extend orthogonally thereto, a resilient section comprising a ridge extending outwardly from said longitudinal axis and formed by a metallic surface inclined to said axial direction, (2) forming a locating plate having a through-aperture, corresponding in outline to the spiral wound element and dimensioned greater than the sealing faces but smaller than the element as a whole, (3) providing at the periphery of the through-aperture an embossment surrounding said aperture and inclined with respect to the plane of the plate to one side thereof at an angle corresponding to the inclination of a said metallic surfaces of the ridge of the element, and (4) securing said embossment to said ridge at a plurality of locations about the periphery of the through-aperture.

Embodiments of the invention will now be described by way of example with referencing to the accompanying drawings, in which FIG. 1 is a sectional elevation through a sealing gasket arrangement in accordance with the present invention, showing a first form of spiral wound element secured centrally disposed with respect to a surrounding thin, planar locating plate, the plane of which is offset with respect to the central plane of the spiral wound element, FIG. 2 is a plan view of the gasket arrangement of FIG. 1, the latter being a section taken along the line I—I of the Figure, showing an array of discrete securing spots between element and locating plate, and FIG. 3 is a sectional elevation through a sealing gasket arrangement also in accordance with the present invention, showing a different construction of spiral wound element and plane of the locating plate centrally disposed with respect to the thickness of the spiral wound element.

Referring to FIGS. 1 and 2, a gasket arrangement 9 comprises a conventional spiral wound element 10 and surrounding it a locating plate device 11.

The spiral wound element conveniently comprises an element of the type described in U.S. Pat. No. 5,161,807, the contents of which is imported by reference. The element is wound about a longitudinal axis 12 from adjacent layers of flexible graphite (or other) filler material 13 and flexible stainless steel reinforcement 14, both in strip form. The steel reinforcement strip is profiled at a central region 15 between its edges into a general V-shape which provides resilience to compressive forces acting along the axis 12 between opposite edges of the strip which, with the filler material, form radially extending sealing faces 18, 19.

The filler strip is omitted from between the reinforced strip towards the radially outer and inner extremities of the spiral wound element to permit the adjacent material turns to be welded together to define and fix the integrity of the spiral wound element. The central section 15 of each strip of the spiral wound element, and particularly of the radially outermost turn 20, is inclined at a substantially constant angle of about 60° to the longitudinal axis 12 in forming said V-section and defines a ridge, indicated at 21, which projects in a radially outward direction and also serves to dispose the spiral wound element with respect to the locating plate 11.

The locating plate 11 has a central through-aperture 22 therein corresponding in outline to the spiral wound element and arrayed about this aperture, and radially outwardly thereof, a plurality of bolt through-apertures $23_1 \ldots 23_4$.

It will be seen that in this embodiment the outer periphery of the locating plate is not circular and locating bolts pass through the plate, unlike traditional guide rings which normally locate within an array of bolts.

The central through-aperture 22 is circular in correspondence with the spiral wound element, and has a diameter greater than the sealing faces 18, 19 of the element but smaller than the element as a whole, so that the locating plate, overlies the ridge 21.

The locating plate 11 is, in an axial direction, much thinner than the spiral wound element in its in compressed state, or an operationally compressed state, in which the surfaces 18, 19 provide a defined degree of sealing between compressing surfaces that is less than possible compression limit. The locating plate is substantially planar, except that in a region 25 surrounding the aperture 22 is formed as an embossment 26 inclined with respect to the plane of the plate to one side thereof at an angle corresponding to the inclination of the ridge 21 such that the embossment overlies only one side of the ridge 21 of the spiral wound gasket. That is, the planar part of the locating plate surrounds the spiral wound element and the embossment comprises an integral radially inward continuation of the planar part. Conveniently the through-aperture 22, and bolt apertures $23_1$ etc are formed by a single punching operation on the plate, which operation simultaneously causes the periphery of the aperture 22 to be deflected as said embossment.

The embossment of the locating plate is secured to the outer turn 20 that defines ridge 21 of the spiral wound element at a plurality of discrete and spaced locations about the periphery of the element. The locating plate 11, and thus the embossment 26, is formed of steel (or other alloy) suitable for being secured to the steel of the spiral wound element by welding.

The locating plate is secured to the outer turn 20 of the element by welding at a plurality of spots $27_1, 27_2 \ldots$ about the periphery of the element. Preferably it is secured at at least eight dimensionally small spots to provide both a generous degree of redundancy in the number of welds, should any fail. The welds are conveniently formed by resistance welding, and as illustrated by ghosted lines in FIG. 1, an electrical circuit 30 may be set up including the outer turn 20 of the spiral wound element, a current source 31 and one of more probes 32 which can both press the embossment locally into contact with the spiral wound element and complete the electrical circuit to enable welding together of the embossment and element at each probed site.

The locating plate is significantly thinner than the spiral wound element, in this embodiment being of the order of 0.010 inch compared with about 0.180 inch for the spiral wound element. The embossment exhibits a degree of resilience with respect to the plane of the locating plate such that when the spiral wound element is in operation compressed in an axial direction by load applied between the sealing faces 18 and 19, the embossment is able to deform with the resilient section 15 of the spiral wound element.

The ability of the embossment to deform with compression of the spiral wound element is believed optimised by the array of discrete dimensionally limited welds, but such construction is not essential. There may of course be any number of points at which the embossment is secured to the edge of the spiral wound element, ranging from one or two, which offer manual minimum impedance to deflection but minimum security against detachment, to contiguous spots which merge into a continuous ring, offering maximum security but also maximum stiffness against deflection of the embossment.

Although as described above, the reinforcement of the spiral wound element and the locating plate may be made from the same metals that facilitate welding, this is not essential provided the embossment can be secured to the spiral wound element. The locating plate may be secured by other methods, such as brazing between, or with, dissimilar metals and/or with adhesives, the latter particularly permitting a locating plate to be formed from a non-metallic material.

It will be appreciated that the length of the embossment 26 in a radial direction is open to variation and, as illustrated in FIG. 1, it may be of such a length in relation to the inclined face of the ridge 21 that the plane of the locating plate is not coincident with the plane bisecting the spiral wound elements. Alternatively, and as shown in FIG. 3 for sealing gasket arrangement 9', the embossment 26' may be of such length that the plane of the locating plate 11' is coincident with the bisecting phase of spiral wound element 10'.

It will also be appreciated that whilst it is convenient for the embossment to be formed as an integral radially-inward 'extension' of the outwardly planar locating plate, it may be formed by securing the embossment and a small radially extending surround to the otherwise substantially planar locating plate.

The form taken by the locating plate radially outwardly of the inclined embossment is a matter of choice, depending upon the usage, and may, of course comprise a circular guide ring, with no further through-apertures, for disposing the gasket arrangement between a circle of flange bolts.

It will be appreciated that the locating plate may be provided with one or more regions of increased thickness to serve as a compression stop for the spiral wound element. Such compression stop region(s) may be integral with the plate or comprise ring or like members welded to the plate, either surrounding the embossment or possibly surrounding discrete bolt apertures 23₁ etc, as shown ghosted at 40.

Where there are bolt holes, such as 23₁–23₄, some or all of the holes may have radially inwardly extending fingers or tongues as shown at 28 of such length and/or thickness as to contact, and interface with the free passages of, bolts or studs passing through the holes, such that the gasket arrangement can be held in position on such bolts or studs in an inverted orientation prior to completion of the joint, the thin, and possibly flexible, material of the locating plate making it suitable for the provision of such fingers by stamping non-circular bolt holes from the thin plate.

It will furthermore also be appreciated that although the spiral wound element is shown as having a circular periphery, it may depart from this shape and the central through-aperture 21 in the locating plate is correspondingly dimensioned to receive the sealing face of the element but to overlie the central resilient ridge section at at least a plurality of points about its periphery where it is secured thereto.

The spiral wound element may have a construction other than that described above and the subject of U.S. Pat. No. 5,161,807 in which the filler material effects significant axial extension from the steel reinforcement, being of the traditional construction which the filler terminates and defines a sealing surface only marginally beyond the reinforcement, as shown in the above-referenced FIG. 3.

I claim:

1. A sealing gasket arrangement comprising
   (1) a spiral wound element, wound about a longitudinal axis, and including, between sealing faces that are separated along its longitudinal axis and extend orthogonally thereto, a resilient section comprising a ridge extending outwardly from said longitudinal axis and formed by metallic surfaces inclined to said axial direction, and
   (2) a locating plate having a through-aperture, corresponding in outline to the spiral wound element and dimensioned greater than the sealing faces but smaller than the element as a whole, and an embossment surrounding said aperture and inclined with respect to a plane of the plate to one side only thereof at an angle corresponding to the inclination of a said metallic surfaces said ridge, said embossment being secured to one surface of said ridge at a plurality of locations about the periphery of the through-aperture.

2. A gasket as claimed in claim 1 in which one surface of said embossment is secured to said one surface of said ridge at a plurality of discrete, spaced locations about the periphery of the through-aperture.

3. A gasket as claimed in claim 2 in which said one surface of said embossment is secured to said one surface of said ridge at eight spaced locations arrayed about the periphery of the through-aperture.

4. A gasket as claimed in claim 1 in which the locating plate is metal and said one surface of said embossment and said one surface of said ridge are secured to each other by welding.

5. A gasket as claimed in claim 4 in which said one surface of said embossment and said one surface of said ridge are secured by welds at a plurality of spots arrayed about the periphery of the through-aperture.

6. A gasket as claimed in claim 4 in which said one surface of said embossment and said one surface of said ridge are secured by eight spot welds arrayed about the periphery of the through-aperture.

7. A gasket as claimed in claim 1 in which said embossment is resiliently deformable with respect to radially outward portions of the locating plate.

8. A gasket as claimed in claim 1 in which the embossment is integral with, and comprises a radially inward continuation of, said locating plate.

9. A gasket as claimed in claim 8 in which said embossment is of the same thickness as radially outward portions of the locating plate.

10. A sealing gasket arrangement comprising
    (1) a spiral wound element, wound about a longitudinal axis, and including, between sealing faces that are separated along its longitudinal axis and extend orthogonally thereto, a resilient section comprising a ridge extending outwardly from said longitudinal axis and formed by metallic surfaces inclined to said axial direction, and
    (2) a locating plate having a through-aperture, corresponding in outline to the spiral wound element and dimensioned greater than the sealing faces but smaller than the element as a whole, and an embossment surrounding said aperture and inclined with respect to a plane of the plate to one side thereof at an angle corresponding to the inclination of a said metallic surfaces of said ridge, said embossment being secured to said ridge at a plurality of locations about the periphery of the through-aperture, and wherein said embossment extends from the through-aperture for a distance greater than the inclined surface of said ridge whereby the plane of the plate surrounding said embossment is not centrally disposed axially between said sealing faces of the spiral wound element.

11. A gasket arrangement as claimed in claim 1 in which the resilient section is arranged to be compressed in the axial direction to an operationally compressed thickness, less than a compression limit, at which a defined degree of sealing is achieved by said sealing surfaces and the locating plate, in an inner region including and surrounding said inclined embossment, has a thickness less than said operationally compressed thickness of the spiral wound gasket.

12. A gasket arrangement as claimed in claim 11 in which said locating plate, in an outer region surrounding said embossment has such a thickness, in excess of the compression limit for the spiral wound element, as to comprise a compression stop for the gasket arrangement.

13. A gasket arrangement as claimed in claim 1 in which the locating plate comprises an array of bolt apertures therethrough arrayed about the longitudinal axis radially outwardly of the embossment.

14. A gasket arrangement as claimed in claim 13 in which spiral wound element is arrayed to be compressed in the axial direction to an operationally compressed thickness, less than a compression limit, at which a defined degree of sealing is achieved by said sealing surfaces and said locating plate has a region surrounding at least one bolt aperture of such a thickness, in excess of the compression limit for the spiral wound element, as to comprise a compression stop for the gasket arrangement.

15. A method of manufacturing a sealing gasket arrangement comprising
    (1) forming a spiral wound element, wound about a longitudinal axis, and including, between sealing faces that are separated along its longitudinal axis and extend orthogonally thereto, a resilient section comprising a ridge extending outwardly from said longitudinal axis and formed by metallic surfaces inched to said axial direction, and
    (2) forming a locating plate having a through-aperture, corresponding in outline to the spiral wound element and dimensioned greater than the sealing faces but smaller than the element as a whole, (3) providing at the periphery of the through-aperture an embossment surrounding said aperture and inclined with respect to the plane of the plate to one side only thereof at an angle corresponding to the inclination of a said metallic surfaces of the ridge of the element, and (4) securing said embossment to one surface of said ridge at a plurality of locations about the periphery of the through-aperture.

16. A method as claimed in claim 15 comprising securing one surface of said embossment to said one surface of said ridge at a plurality of discrete, spaced locations about the periphery of the through-aperture.

17. A method as claimed in claim 16 comprising securing one surface of said embossment to said one surface of said ridge at eight spaced locations arrayed about the periphery of the through-aperture.

18. A method as claimed in claim 15 wherein step (4) is carried out by welding said one surface of said embossment and said one surface of said ridge.

19. A method as claimed in claim 18 wherein step (4) is carried out by resistance welding.

20. A method as claimed in claim 15 comprising forming the locating plate with said embossment integral with, and a radially inward continuation of, said locating plate.

21. A method of manufacturing a sealing gasket arrangement comprising (1) forming a spiral wound element, wound about a longitudinal axis, and including, between sealing faces that are separated along its longitudinal axis and extend orthogonally thereto, a resilient section comprising a ridge extending outwardly from said longitudinal axis and formed by metallic surfaces inclined to said axial direction, and (2) forming a locating plate having a through-aperture, corresponding in outline to the spiral wound element and dimensioned greater than the sealing faces but smaller than the element as a whole, (3) providing at the periphery of the through-aperture an embossment surrounding said aperture and inclined with respect to the plane of the plate to one side thereof at an angle corresponding to the inclination of a said metallic surfaces of the ridge of the element, and (4) resistance welding said embossment to said ridge at a plurality of locations about the periphery of the through-aperture; and wherein said through-aperture in the locating plate and said inched embossment are formed by punching the material of said aperture from the plate and simultaneously therewith deforming the periphery of the aperture to form the embossment.

* * * * *